US011493107B2

(12) United States Patent
Pu et al.

(10) Patent No.: US 11,493,107 B2
(45) Date of Patent: Nov. 8, 2022

(54) SINGLE-DEGREE-OF-FREEDOM MAGNETIC DAMPING SHOCK ABSORBER BASED ON EDDY CURRENT EFFECT

(71) Applicants: Shanghai University; Chongqing University, Chongqing (CN)

(72) Inventors: Huayan Pu, Shanghai (CN); Wenyuan He, Shanghai (CN); Wenjiang Wu, Shanghai (CN); Min Wang, Shanghai (CN); Jun Luo, Chongqing (CN); Jiheng Ding, Shanghai (CN); Yi Sun, Shanghai (CN); Long Bai, Chongqing (CN); Yan Peng, Shanghai (CN); Shaorong Xie, Shanghai (CN)

(73) Assignees: Shanghai University, Shanghai (CN); Chongqing University, Chongqing (CN)

( * ) Notice: Subject to any disclaimer, the term of this patent is extended or adjusted under 35 U.S.C. 154(b) by 3 days.

(21) Appl. No.: 17/362,996

(22) Filed: Jun. 30, 2021

(65) Prior Publication Data
US 2021/0404529 A1    Dec. 30, 2021

(30) Foreign Application Priority Data

Jun. 30, 2020    (CN) .......................... 202010622973.4

(51) Int. Cl.
*F16F 13/00*    (2006.01)
*F16F 6/00*    (2006.01)

(52) U.S. Cl.
CPC ............ *F16F 13/005* (2013.01); *F16F 6/005* (2013.01); *F16F 2222/06* (2013.01);
(Continued)

(58) Field of Classification Search
CPC ...... F16F 15/035; F16F 2234/08; F16F 6/005; F16F 13/005
See application file for complete search history.

(56) References Cited

U.S. PATENT DOCUMENTS

2002/0089105 A1* 7/2002 Fujita ..................... F16F 6/005
                                                              267/140.14

FOREIGN PATENT DOCUMENTS

CN          108980263 A    * 12/2018    ............ F16F 15/023
CN          109163046 A    *  1/2019    ............. F16F 15/30
(Continued)

Primary Examiner — Melanie Torres Williams
(74) Attorney, Agent, or Firm — Bochner IP, PLLC; Andrew D. Bochner

(57) ABSTRACT

The present disclosure provides a single-degree-of-freedom (SDOF) magnetic damping shock absorber based on an eddy current effect, comprising a lower plate, a ring-shaped magnet a, a ring-shaped magnet b, an aluminum cylinder, a bottom copper sheet, a copper sheet, a top copper sheet, a bearing seat, a linear bearing, a bearing end cap, a load, a piston shaft, a stepped shaft, a fixed collar, a coil spring, a lower clamping shaft, and fixing screws. When the shock absorber is working, the ring-shaped magnet a keeps stationary at the lower end and the ring-shaped magnet b reciprocates in the vertical direction. Both magnets are arranged in a mutual attraction manner. Under the action of a time-varying electromagnetic field generated by the relative movement of the ring-shaped magnet b, the copper sheet arranged between the two ring-shaped magnets generates eddy current damping. The movement of the ring-shaped magnet b is inhibited.

5 Claims, 5 Drawing Sheets

(52) U.S. Cl.
CPC ... *F16F 2224/0208* (2013.01); *F16F 2232/08* (2013.01); *F16F 2234/02* (2013.01)

(56) References Cited

FOREIGN PATENT DOCUMENTS

| | | | | | |
|---|---|---|---|---|---|
| CN | 109578484 | A | * | 4/2019 | ............... E04B 1/98 |
| CN | 110118235 | A | * | 8/2019 | ............... F16F 6/005 |
| JP | 2002021922 | A | * | 1/2002 | ............... F16F 15/03 |

* cited by examiner

SINGLE-DEGREE-OF-FREEDOM MAGNETIC DAMPING SHOCK ABSORBER BASED ON EDDY CURRENT EFFECT

CROSS REFERENCE TO RELATED APPLICATION(S)

This patent application claims the benefit and priority of Chinese Patent Application No. 202010622973.4, filed on Jun. 30, 2020, the disclosure of which is incorporated by reference herein in its entirety as part of the present application.

TECHNICAL FIELD

The present disclosure relates to the technical field of vibration reduction, and in particular, to a single-degree-of-freedom (SDOF) magnetic damping shock absorber based on an eddy current effect.

BACKGROUND ART

Vibration is a common phenomenon in engineering technologies and also usually occurs in daily life. The vibration is also an important factor in affecting the processing accuracy and working accuracy of devices in some complex environments. People have paid much attention to vibration reduction and developed various vibration reduction devices by which the processing accuracy and production efficiency are extremely improved.

A traditional passive shock absorber is composed of a mass, a spring, and a damping element that have set parameters. With a simple and reliable structure, the traditional passive shock absorber can meet the production requirements in common industrial occasions. However, it cannot satisfy people's demands on precision devices due to its shortcomings of poor effects of low frequency isolation and ultra-low frequency vibration. Therefore, semi-active vibration reduction and active vibration reduction are mainly researched. At present, shock absorbers are controlled in three modes: passive control, active control, and semi-active control. Due to the simple structure and low cost, shock absorbers based on the passive control mode are widely used and usually designed for use according to specific engineering requirements. According to the information of controlled objects that is acquired by sensors in real time, shock absorbers based on the active control mode can directly provide a force to balance the force generated by vibration. This extremely improves the system performance. Since they require the supply of external power to provide rapid response, the cost is higher and they are not frequently used in actual production. Shock absorbers based on the semi-active control mode can change inherent frequency according to the information of controlled objects that is acquired by sensors in real time. In this way, they can achieve an excellent vibration reduction effect, without consuming much energy. In spite of this, there are also some limitations in use.

SUMMARY

The present disclosure provides an SDOF magnetic damping shock absorber based on an eddy current effect to solve the problems in the prior art and consume vibration energy, thus improving the performance of vibration reduction.

To achieve the above objective, the present disclosure adopts the following technical solutions: The present disclosure provides an SDOF magnetic damping shock absorber based on an eddy current effect, including a lower plate, an aluminum cylinder, a bearing seat, a piston shaft, a stepped shaft, a ring-shaped magnet a, a ring-shaped magnet b, and a copper sheet, wherein the bottom of the aluminum cylinder is fixedly connected to the lower plate and the top of the aluminum cylinder is connected to the bearing seat;

the ring-shaped magnet a is nested in the lower plate and located at an inner side of the aluminum cylinder; four notches are formed in the aluminum cylinder along the circumference; a top copper sheet and a bottom copper sheet are placed in the notches in sequence and the distance therebetween is adjustable; the copper sheet has an adjustable thickness and quantity, is fixed between the top copper sheet and the bottom copper sheet and is located at the inner side of the aluminum cylinder; a linear bearing is embedded into an upper part of the bearing seat and is fixedly clamped by a bearing end cap; an upper end of the piston shaft is connected to a load and a lower end of the piston shaft penetrates through the bearing end cap, the linear bearing and the bearing seat in sequence and stretches into the aluminum cylinder to be connected to the stepped shaft; the ring-shaped magnet b is provided on a middle section of the stepped shaft through a fixed collar; a coil spring is provided between an upper end of the lower plate and a lower end of the stepped shaft; the ring-shaped magnet a and the ring-shaped magnet b are provided by magnetic attraction; and a lower clamping shaft is provided at the bottom center of the lower plate.

Preferably, the ring-shaped magnet a may be stationary and the ring-shaped magnet b may reciprocate in the vertical direction.

Preferably, the thicknesses of the ring-shaped magnet a and the ring-shaped magnet b may be changeable.

Preferably, the four notches may be uniformly distributed along the circumference of the aluminum cylinder. The notches may be rack-shaped in the vertical direction, and all racks may have the same thickness. The top copper sheet and the bottom copper sheet may be accommodated in rack-shaped grooves of the notches. Outer ends of the top copper sheet and the bottom copper sheet may be fixedly connected through screws, and the copper sheet may be clamped by inner ends of the top copper sheet and the bottom copper sheet.

Preferably, the aluminum cylinder, the lower plate, the bearing seat, and the bearing end cap may be made of 7075 aluminum alloy; and the piston shaft, the stepped shaft, the fixed collar, and the lower clamping shaft may be made of stainless steel.

Preferably, the coil spring may be selected from springs with different stiffness.

The present disclosure achieves the following technical effects compared with the prior art:

The SDOF magnetic damping shock absorber based on an eddy current effect features a compact structure, high strength, small size, capability of generating a great damping force, strong cushioning and vibration reduction effects and the like. Furthermore, the coil spring, the magnets, and the copper sheet are used as double vibration reduction elements, which effectively reduce the vibration of the load.

BRIEF DESCRIPTION OF THE DRAWINGS

To describe the technical solutions in the embodiments of the present disclosure or in the prior art more clearly, the accompanying drawings required for describing the embodiments are briefly described below. Apparently, the accompanying drawings in the following description show merely some embodiments of the present disclosure, and a person of ordinary skill in the art may still derive other drawings from these accompanying drawings without creative efforts.

Figure 1:
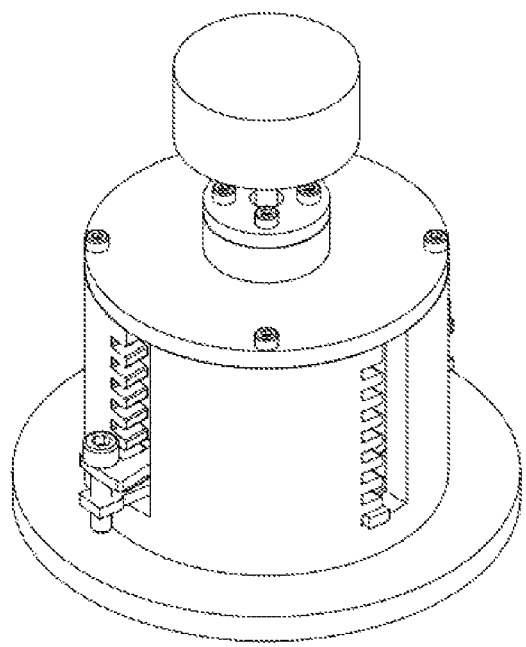
FIG. 1 is a stereoscopic view of the present disclosure.
Figure 2:
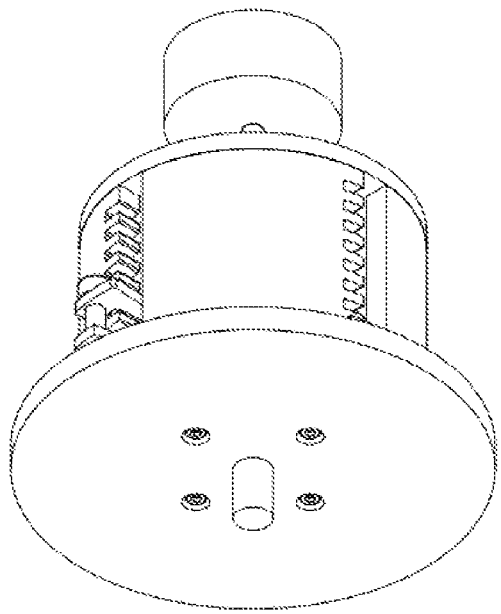
FIG. 2 is a stereoscopic view of the present disclosure from another angle of view.
Figure 3:
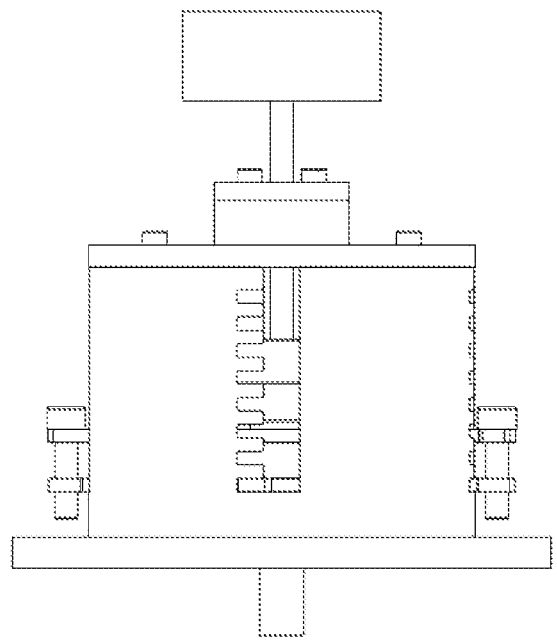
FIG. 3 is a front view of the present disclosure.
Figure 4:
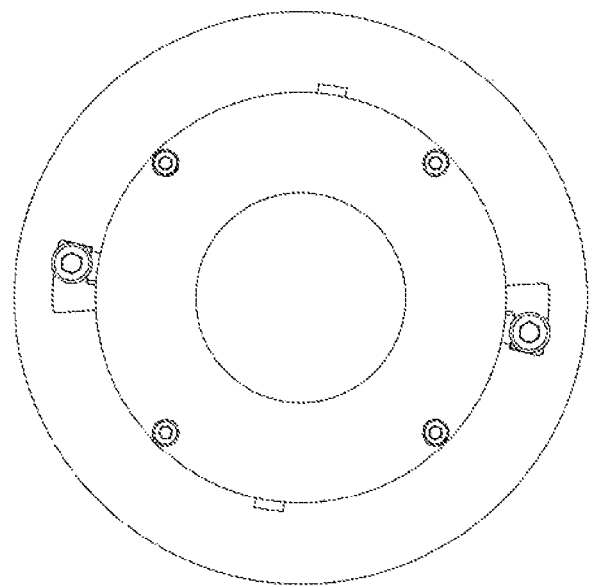
FIG. 4 is a top view of the present disclosure.
Figure 5:
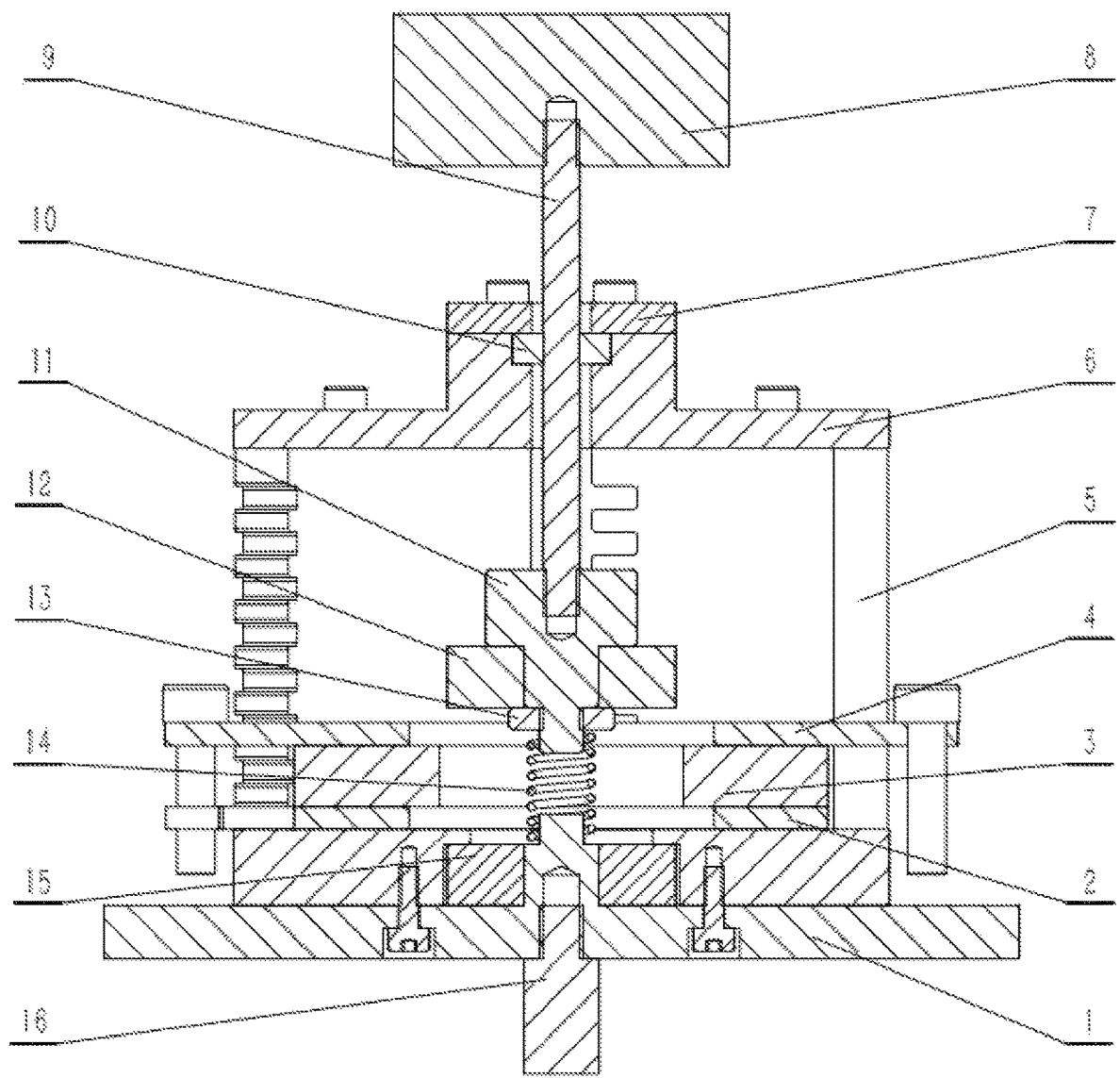
FIG. 5 is a structural sectional view of the present disclosure.
Figure 6A:
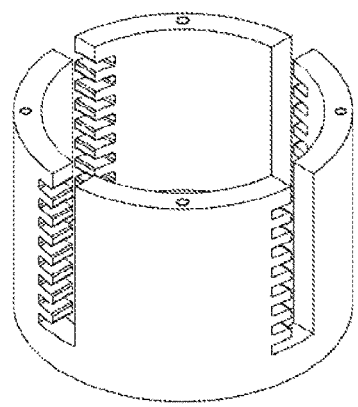
FIG. 6a and FIG. 6b are structural views of the aluminum cylinder of the present disclosure.
Figure 6B:
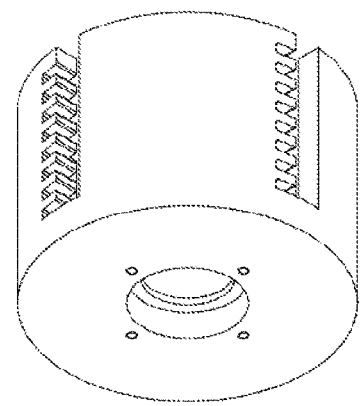
Figure 7:
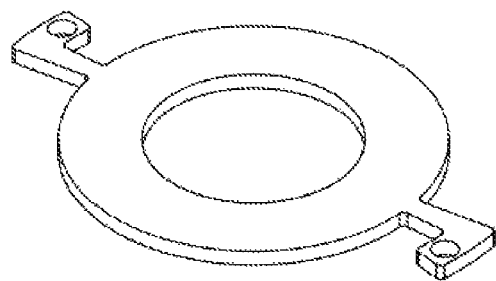
FIG. 7 shows a top copper sheet of the present disclosure.
Figure 8:
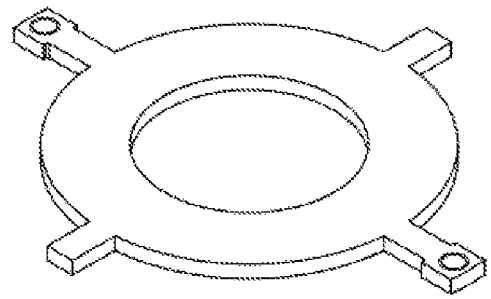
FIG. 8 shows a bottom copper sheet of the present disclosure.

Reference numerals: 1: lower plate; 2: bottom copper sheet; 3: copper sheet; 4: top copper sheet; 5: aluminum cylinder; 6: bearing seat; 7: bearing end cap; 8: load; 9: piston shaft; 10: linear bearing; 11: stepped shaft; 12: ring-shaped magnet b; 13: fixed collar; 14: coil spring; 15: ring-shaped magnet a; and 16: lower clamping shaft.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The present disclosure provides an SDOF magnetic damping shock absorber based on an eddy current effect to solve the problems in the prior art and consume vibration energy, thus improving the performance of vibration reduction.

To make the foregoing objective, features, and advantages of the present disclosure clearer and more comprehensible, the present disclosure will be further described in detail below with reference to the accompanying drawings and specific embodiments.

To effectively reduce the influences of vibration on life, work, and health of people and improve the accuracy of precision engineering facilities and instruments, the present disclosure provides an SDOF magnetic damping shock absorber based on an eddy current effect, as shown in FIG. 1 to FIG. 9. With the help of such shock absorber, the vibration energy is dissipated by means of an eddy current damping effect, thus effectively reducing the vibration. Furthermore, parts with different sizes designed for the shock absorber make it be adapted to multiple environments.

The SDOF magnetic damping shock absorber based on an eddy current effect includes a lower plate 1, a ring-shaped magnet a 15, an aluminum cylinder 5, a bottom copper sheet 2, a copper sheet 3, a top copper sheet 4, a bearing seat 6, a linear bearing 10, a bearing end cap 7, a load 8, a piston shaft 9, a stepped shaft 11, a ring-shaped magnet b 12, a fixed collar 13, a coil spring 14, a lower clamping shaft 16, and fixing screws.

The aluminum cylinder 5 is arranged at a lower end of a lower base and is fixedly connected to the lower base through hexagon socket head cap screws; the lower clamping shaft 16 is arranged at a lower end of the lower plate 1; the ring-shaped magnet a 15 is arranged on a protruding middle shaft section at an upper end of the lower plate 1; the copper sheet 3 is arranged between the top copper sheet 4 and the bottom copper sheet 2; the top copper sheet 4 and the bottom copper sheet 2 are arranged on the aluminum cylinder 5; the bearing seat 6 is arranged at an upper end of the aluminum cylinder 5 and fixed through hexagon socket head cap screws; the linear bearing 10 is arranged at an upper end of the bearing seat 6; the bearing end cap 7 is arranged at the upper end of the bearing seat 6 and is fixed through hexagon socket head cap screws; the piston shaft 9 is arranged in the aluminum cylinder 5 and fitted with the linear bearing 10 to move along the vertical direction; the load 8 is arranged at an upper end of the piston shaft 9; the stepped shaft 11 is arranged at a lower end of the piston shaft 9; the ring-shaped magnet b 12 is arranged on the stepped shaft 11 and the fixed collar is arranged at a lower end of the stepped shaft 11; and the coil spring 14 is arranged between the lower end of the stepped shaft 11 and the protruding middle shaft section of the lower plate 1 and mainly supports the load 8.

The magnetic damping shock absorber provided by the present disclosure can generate a damping force by means of the ring-shaped magnet a 15, the ring-shaped magnet b, the copper sheet 3, and the coil spring 14. When the shock absorber is working, the ring-shaped magnet a 15 keeps stationary at the lower end and the ring-shaped magnet b 12 reciprocates in the vertical direction. Both magnets are arranged in a mutual attraction manner. During this process, the coil spring 14 acts as a positive stiffness element to support the load 8. Under the action of a time-varying electromagnetic field generated by the relative movement of the ring-shaped magnet b 12, the copper sheet 3 between the two ring-shaped magnets generates eddy current damping. Furthermore, the movement of the ring-shaped magnet b 12 is inhibited and the vibration of the load 8 is reduced in a manner of dissipating the vibration energy.

The present disclosure has the following technical features:

In the magnetic damping shock absorber, the ring-shaped magnet a 15 is stationary and the ring-shaped magnet b 12 reciprocates in the vertical direction under the action of external acting forces and the acting force of the ring-shaped magnet a 15. The relative movement of the ring-shaped magnet b 12 generates the time-varying electromagnetic field that makes the copper sheet 3 generate the eddy current damping. The direction of the eddy current damping generated on the copper sheet 3 is opposite to the movement direction of the ring-shaped magnet b 12. By dissipating the vibration energy, such eddy current damping inhibits the vibration of the load 8.

To reasonably adjust the size of a damping force, magnets with different sizes and copper sheets 3 with different thicknesses can be used, and the quantity of the copper sheets 3 and relative positions between the magnets and the copper sheets 3 can be adjusted according to the intensity of the vibration energy.

The present disclosure defines the relationship between the size of magnetic damping, and part parameters of the magnets and the copper sheets 3. This facilitates the optimized design of damping shock absorbers meeting the requirements on performance.

The four notches are formed in the aluminum cylinder 5 along the circumference. The notches are rack-shaped in the vertical direction, and all racks have the same thickness. The notches are designed for two purposes: Firstly, the notches are used for mounting the top copper sheet 4 and the bottom copper sheet 2; the top copper sheet and the bottom copper sheet are clamped in the notches of the aluminum cylinder 5 and fixedly connected through the hexagon socket head cap screws. Secondly, the height and number of the copper sheets 3 can be conveniently adjusted in the presence of the notches, so as to change the damping size of the damping shock absorber and improve the vibration reduction performance.

The lower end of the aluminum cylinder 5 is designed to fixedly clamp the ring-shaped magnet a 15 in the vertical direction, preventing the magnetic field from changes due to the looseness of the magnet, and furthermore, preventing the vibration reduction effect of the shock absorber from being weakened. By adopting 7075 aluminum alloy, the aluminum cylinder 5, the lower plate 1, the bearing seat 6, and the bearing end cap 7 are high in strength, easy to machine, and good in wear resistance and corrosion resistance, and have good mechanical properties. Therefore, these components can be used in complex and severe environments. By adopting stainless steel, the piston shaft 9, the stepped shaft 11, the fixed collar 13, and the lower clamping shaft 16 have good anti-rust performance. Furthermore, these components can reduce the influences such as friction caused by materials as time goes by. In addition, these components have high strength and hardness and can bear great impact and load.

The protruding shaft section at the upper end of the lower plate 1 is fitted with the ring-shaped magnet a 15, ensuring the installation position of the lower plate. The lower end of the lower plate 1 and the lower clamping shaft 16 are fixed through threaded connection, ensuring that the lower plate can be installed on a device for testing the damping size. An upper end of the stepped shaft 11 is connected to the piston shaft 9, a middle part of the stepped shaft is fitted with the ring-shaped magnet b 12, and the lower end of the stepped shaft prevents the magnet from axial movement through the fixed collar 13. According to the present disclosure, different combinations of the coil spring 14 with different stiffness, the magnets, and the copper sheets 3 are adopted to realize vibration reduction at different frequencies. Therefore, the shock absorber can be adapted to multiple frequency bands, and particularly, has good performance in terms of vibration reduction at low frequencies.

The present disclosure can be used to research the influences of parts with various parameters on the vibration reduction performance. By changing the sizes of the ring-shaped magnets, the thicknesses and quantity of the copper sheets 3, the type and stiffness of the positive stiffness spring, the relative positions between the magnets and the copper sheets 3 and the like, the present disclosure clarifies the influences on the damping size by parameter changes. This facilitates the optimized design of damping shock absorbers with better performance.

Figure 9:
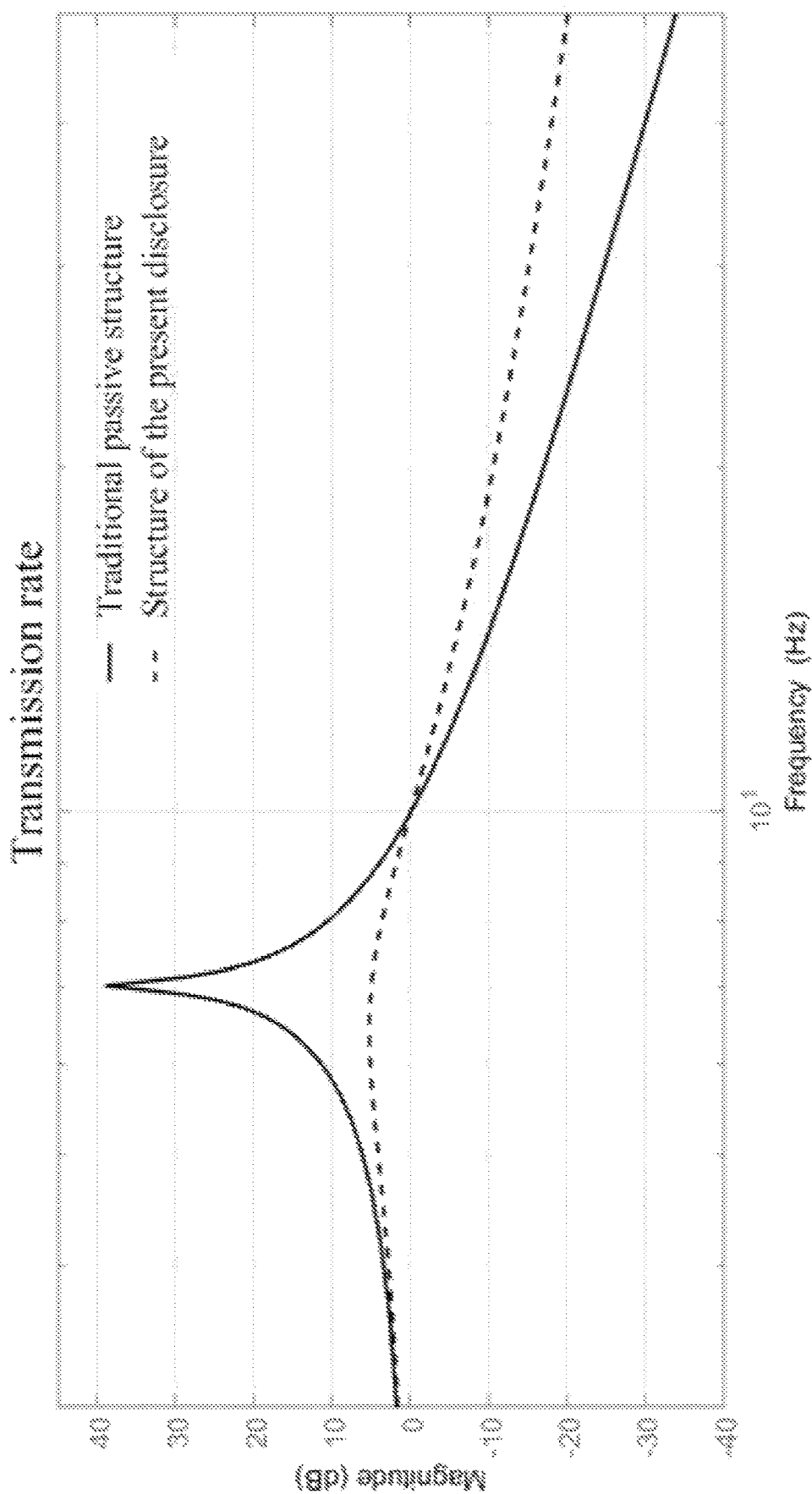
FIG. 9 is a correlation curve of frequency domains between the present disclosure and a traditional passive structure.

FIG. 9 is a correlation curve of frequency domain responses between the magnetic damping shock absorber provided by the present disclosure and the traditional passive structure. It can be seen from the correlation curve that the transmission rate of vibration has a very high resonance peak value when the traditional structure is used, but the resonance peak value is greatly reduced when the magnetic damping shock absorber is used. This indicates that the magnetic damping shock absorber greatly improves the damping of the system and remarkably improves the vibration reduction performance of the whole system.

Specific examples are used for illustration of the principles and implementations of the present disclosure. The description of the embodiments is used to help illustrate the method and its core principles of the present disclosure. In addition, those skilled in the art can make various modifications in terms of specific implementations and scope of application according to the teachings of the present disclosure. In conclusion, the content of the present specification should not be construed as a limitation to the present disclosure.

What is claimed is:

1. A single-degree-of-freedom (SDOF) magnetic damping shock absorber based on an eddy current effect, comprising a lower plate, an aluminum cylinder, a bearing seat, a piston shaft, a stepped shaft, a ring-shaped magnet a, a ring-shaped magnet b, and a copper sheet, wherein the bottom of the aluminum cylinder is fixedly connected to the lower plate and the top of the aluminum cylinder is connected to the bearing seat;

the ring-shaped magnet a is nested in the lower plate and located at an inner side of the aluminum cylinder; four notches are formed in the aluminum cylinder along the circumference; a top copper sheet and a bottom copper sheet are placed in the notches in sequence and the distance therebetween is adjustable; the copper sheet has an adjustable thickness and quantity, is fixed between the top copper sheet and the bottom copper sheet and is located at the inner side of the aluminum cylinder; a linear bearing is embedded into an upper part of the bearing seat and is fixedly clamped by a bearing end cap; an upper end of the piston shaft is connected to a load and a lower end of the piston shaft penetrates through the bearing end cap, the linear bearing and the bearing seat in sequence and stretches into the aluminum cylinder to be connected to the stepped shaft; the ring-shaped magnet b is provided on a middle section of the stepped shaft through a fixed collar; a coil spring is provided between an upper end of the lower plate and a lower end of the stepped shaft; the ring-shaped magnet a and the ring-shaped magnet b are provided by magnetic attraction; and a lower clamping shaft is provided at the bottom center of the lower plate; and the four notches are uniformly distributed along the circumference of the aluminum cylinder; the notches are rack-shaped in the vertical direction, and all racks have the same thickness; the top copper sheet and the bottom copper sheet are accommodated in rack-shaped grooves of the notches; outer ends of the top copper sheet and the bottom copper sheet are fixedly connected through screws, and the copper sheet is clamped by inner ends of the top copper sheet and the bottom copper sheet.

2. The SDOF magnetic damping shock absorber based on an eddy current effect according to claim 1, wherein, the ring-shaped magnet a is stationary and the ring-shaped magnet b can reciprocate in the vertical direction.

3. The SDOF magnetic damping shock absorber based on an eddy current effect according to claim 1, wherein, the thicknesses of the ring-shaped magnet a and the ring-shaped magnet b are changeable.

4. The SDOF magnetic damping shock absorber based on an eddy current effect according to claim 1, wherein, the aluminum cylinder, the lower plate, the bearing seat, and the bearing end cap are made of 7075 aluminum alloy; and the piston shaft, the stepped shaft, the fixed collar, and the lower clamping shaft are made of stainless steel.

5. The SDOF magnetic damping shock absorber based on an eddy current effect according to claim 1, wherein, the coil spring can be selected from springs with different stiffness.

\* \* \* \* \*